(12) United States Patent
Diller

(10) Patent No.: US 8,827,298 B2
(45) Date of Patent: Sep. 9, 2014

(54) JAWED FIFTH WHEEL HITCH

(71) Applicant: Curt Manufacturing, LLC, Eau Claire, WI (US)

(72) Inventor: Joel Diller, Eau Claire, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 38 days.

(21) Appl. No.: 13/682,541

(22) Filed: Nov. 20, 2012

(65) Prior Publication Data

US 2014/0138933 A1    May 22, 2014

(51) Int. Cl.
 *B62D 53/08* (2006.01)
(52) U.S. Cl.
 CPC ............ *B62D 53/0842* (2013.01); *B62D 53/08* (2013.01)
 USPC ............................ 280/433; 280/434; 280/435
(58) Field of Classification Search
 CPC ................................ B62D 53/12; B62D 53/08
 USPC .................................................. 280/433–435
 See application file for complete search history.

(56) References Cited

U.S. PATENT DOCUMENTS

| | | | |
|---|---|---|---|
| 2,096,282 A * | 10/1937 | Kortering | 280/435 |
| 3,079,175 A * | 2/1963 | Walther | 280/434 |
| 4,106,793 A | 8/1978 | Neff | |
| 4,213,590 A | 7/1980 | VanDyke | |
| 4,225,276 A | 9/1980 | Stoller et al. | |
| 4,333,666 A | 6/1982 | Hammonds | |
| 4,375,894 A | 3/1983 | Hammonds | |
| 4,428,595 A | 1/1984 | Martin et al. | |
| 4,566,715 A | 1/1986 | Buckley | |
| 4,721,323 A | 1/1988 | Czuk et al. | |
| 4,743,150 A * | 5/1988 | Hlinsky | 410/64 |
| 4,871,182 A * | 10/1989 | Altherr et al. | 280/434 |
| 6,726,234 B2 * | 4/2004 | Lund | 280/438.1 |
| 6,846,000 B2 | 1/2005 | Grinde et al. | |
| 6,908,093 B1 | 6/2005 | Putnam | |
| 6,935,650 B2 | 8/2005 | Grinde et al. | |
| 7,475,899 B2 | 1/2009 | Crawley | |
| 7,537,235 B2 * | 5/2009 | Flater et al. | 280/433 |
| 7,543,837 B2 | 6/2009 | Crawley | |
| 7,584,982 B2 | 9/2009 | Fisher | |
| 7,988,176 B2 | 8/2011 | Colibert et al. | |
| 7,988,177 B2 | 8/2011 | Colibert et al. | |
| 8,132,825 B1 | 3/2012 | Choquette et al. | |
| 8,366,134 B1 | 2/2013 | Choquette et al. | |
| 2003/0015855 A1 | 1/2003 | McCoy et al. | |

* cited by examiner

*Primary Examiner* — Kevin Hurley
*Assistant Examiner* — Michael Stabley
(74) *Attorney, Agent, or Firm* — Shewchuk IP Services, LLC; Jeffrey D. Shewchuk

(57) ABSTRACT

Jaws of a fifth wheel hitch have front arms that overlap each other. The jaws are linked for simultaneous movement at the same speed and corresponding positions when closing around the kingpin, and a pawl holds the jaws closed. A handle moves a pawl to unlock the hitch to allow ejection of the kingpin, and once the jaws are open the pawl holds them open. A position indicator is linked both to the handle and to one of the jaws. The position indicator moves between three indications: locked, unlocked and open.

19 Claims, 11 Drawing Sheets

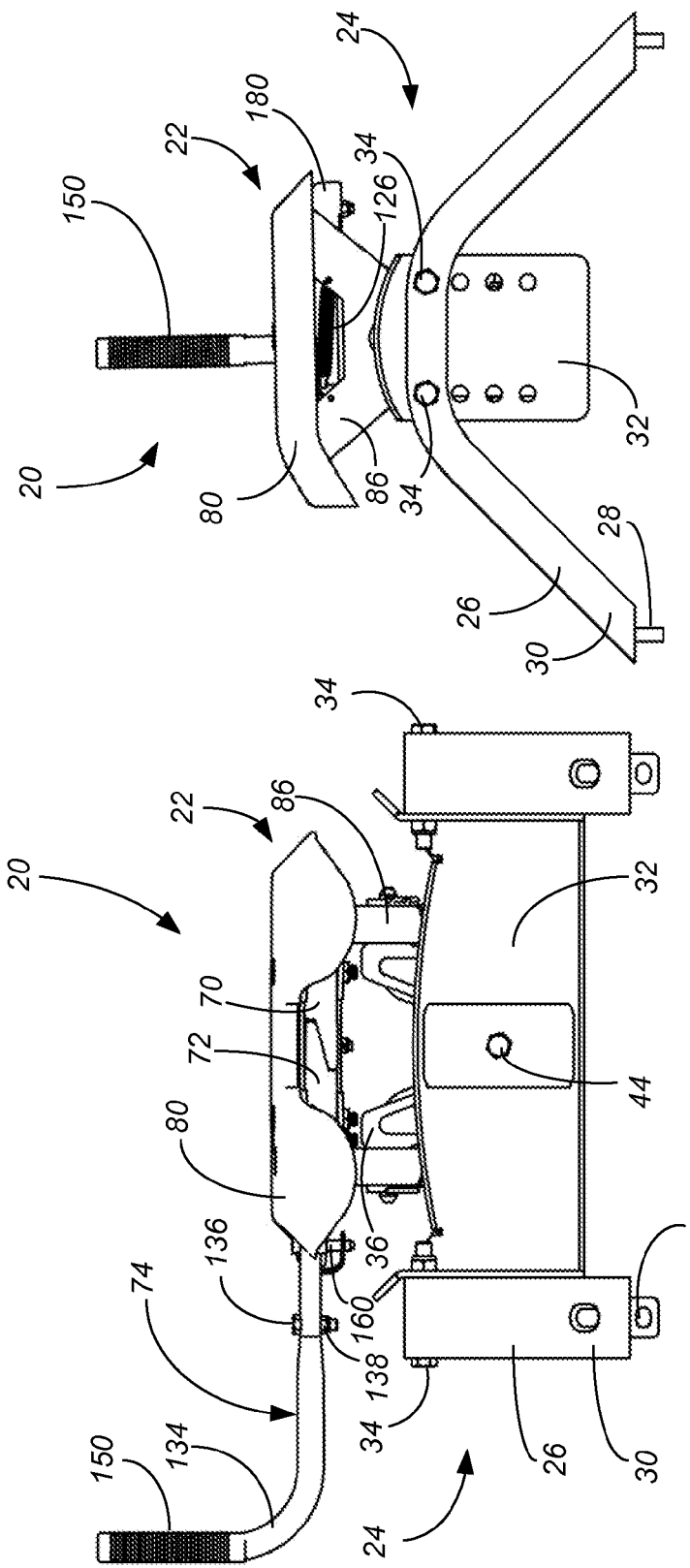

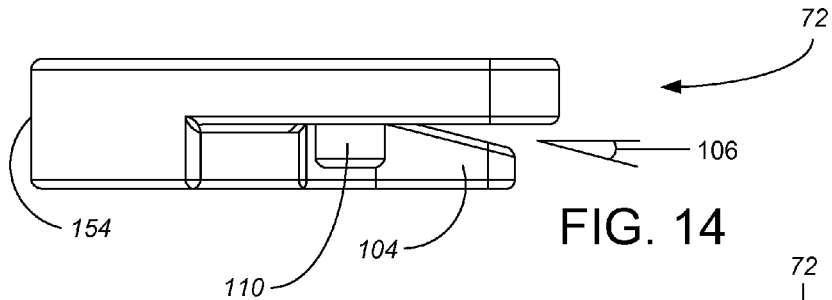
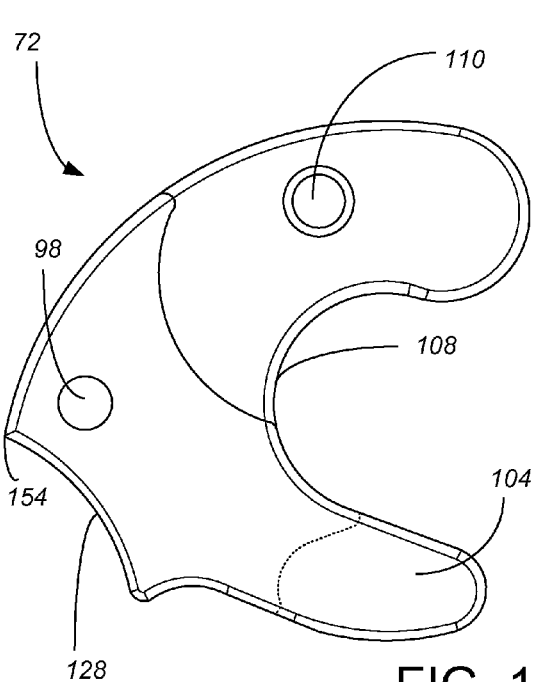
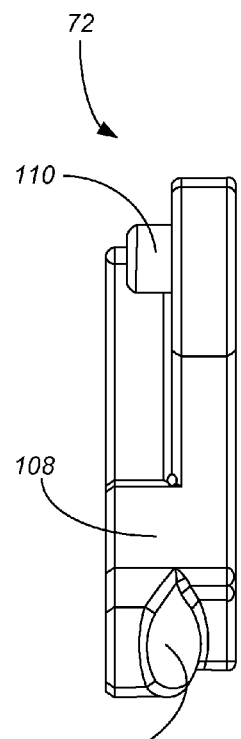
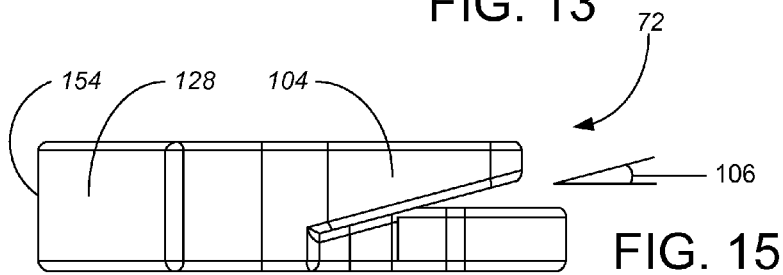

JAWED FIFTH WHEEL HITCH

CROSS-REFERENCE TO RELATED APPLICATION(S)

None.

BACKGROUND OF THE INVENTION

Fifth wheel hitches are well-known in the hitch industry and are designed for carrying much heavier loads than the typical ball hitch can handle. The fifth-wheel trailer includes a downwardly-facing pin, called a kingpin, which extends generally vertically on the leading tongue of the trailer. The fifth wheel hitch includes a large, flat skid plate shaped similar to a horseshoe. The kingpin is secured within the opening of the horseshoe by one or two jaws. The jaw(s) hold the position of the kingpin while allowing allow pivoting to accommodate turns, hills, etc. Various control lever structures have been used for moving the jaws to release the kingpin. Examples of such a fifth-wheel hitch are disclosed in U.S. Pat. Nos. 6,846,000 and 6,935,650, 7,475,899, 7,543,837 and 7,584,982, each incorporated by reference.

The fifth wheel hitch must be strong to securely engage the trailer, minimizing the possibility of breakage or of any way the trailer could inadvertently come loose. At the same time, the fifth wheel hitch should be simple to operate, so the operator has no difficulty in intentionally engaging and disengaging the trailer. Operation of the controls of the fifth wheel hitch to lock and release the jaw(s) should not require the application of excessive force or torque. The average operator of a fifth-wheel or gooseneck hitch is not young, such as over 55 years old, who is perhaps not as strong and nimble as he or she once was. The controls of the hitch should be readily accessible by the operator, without requiring too much climbing or bending to access. The fifth wheel hitch should preferably be mechanically operated, so there is no possibility of a loss of power preventing operation of the hitch.

Towing conditions are such that hitches are normally subjected to considerable amounts of dirt and grime, and treated very roughly. The hitch should readily withstand such conditions. The hitch must be robust and reliable, to last for carefree operation over the life of at least one vehicle, and possibly over the life of several vehicles, despite the fact that the hitch will likely be openly exposed to weather over its years or decades of use. As much as possible, the hitch should also have minimal cost and expense in manufacturing and assembly. In keeping with these objectives, further improvements to fifth wheel hitch designs are possible.

BRIEF SUMMARY OF THE INVENTION

The present invention is in part directed at fifth wheel hitches having at least two jaws, and involves the realization that such jaws should be constructed and linked to jointly close more convincingly around the kingpin. In one aspect, the jaws of the fifth wheel hitch overlap each other and move without changing elevation, so there is no vertical gap that the kingpin is trying to work its way through and no perception that roadway vibration could unseat the jaws relative to each other. In another aspect the jaws are linked for simultaneous movement at the same speed and corresponding positions when closing around the kingpin. In a separate aspect, a position indicator is linked both to a handle for the fifth wheel hitch and separately linked to at least one jaw. The position indicator moves between three indications (locked, unlocked and open), even if the handle and/or the jaw does not move between two of those three indications.

BRIEF DESCRIPTION OF THE DRAWINGS

FIGS. 3 and 4 are rear elevation and passenger side views of the fifth wheel hitch of FIGS. 1 and 2.

FIGS. 13-16 are top (plan, with the front of the jaw at the top of the page), front, rear (elevation) and side views of the driven (driver's side) jaw of FIGS. 11 and 12.

Figure 1:
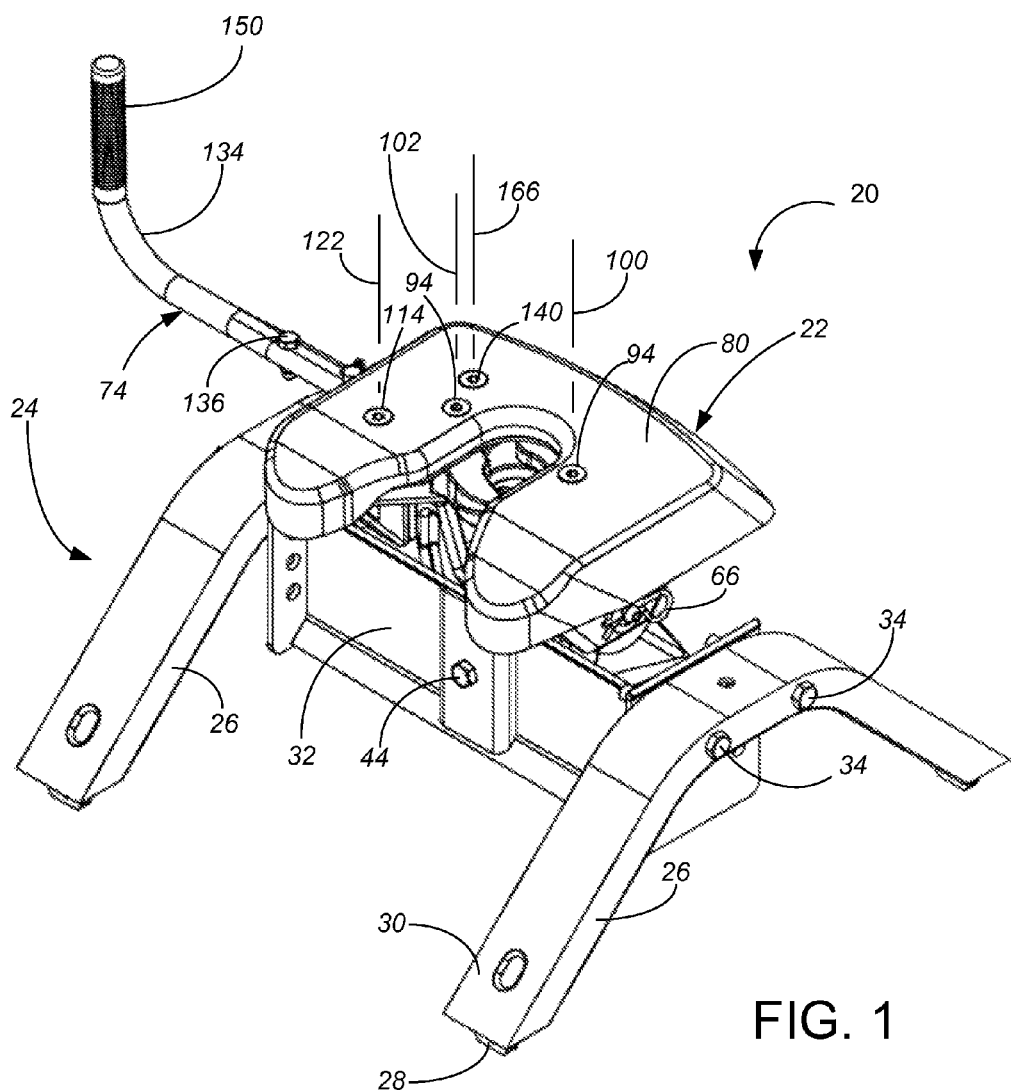
FIG. 1 is a perspective view of a preferred embodiment of the fifth wheel hitch of the present invention.
Figure 2:
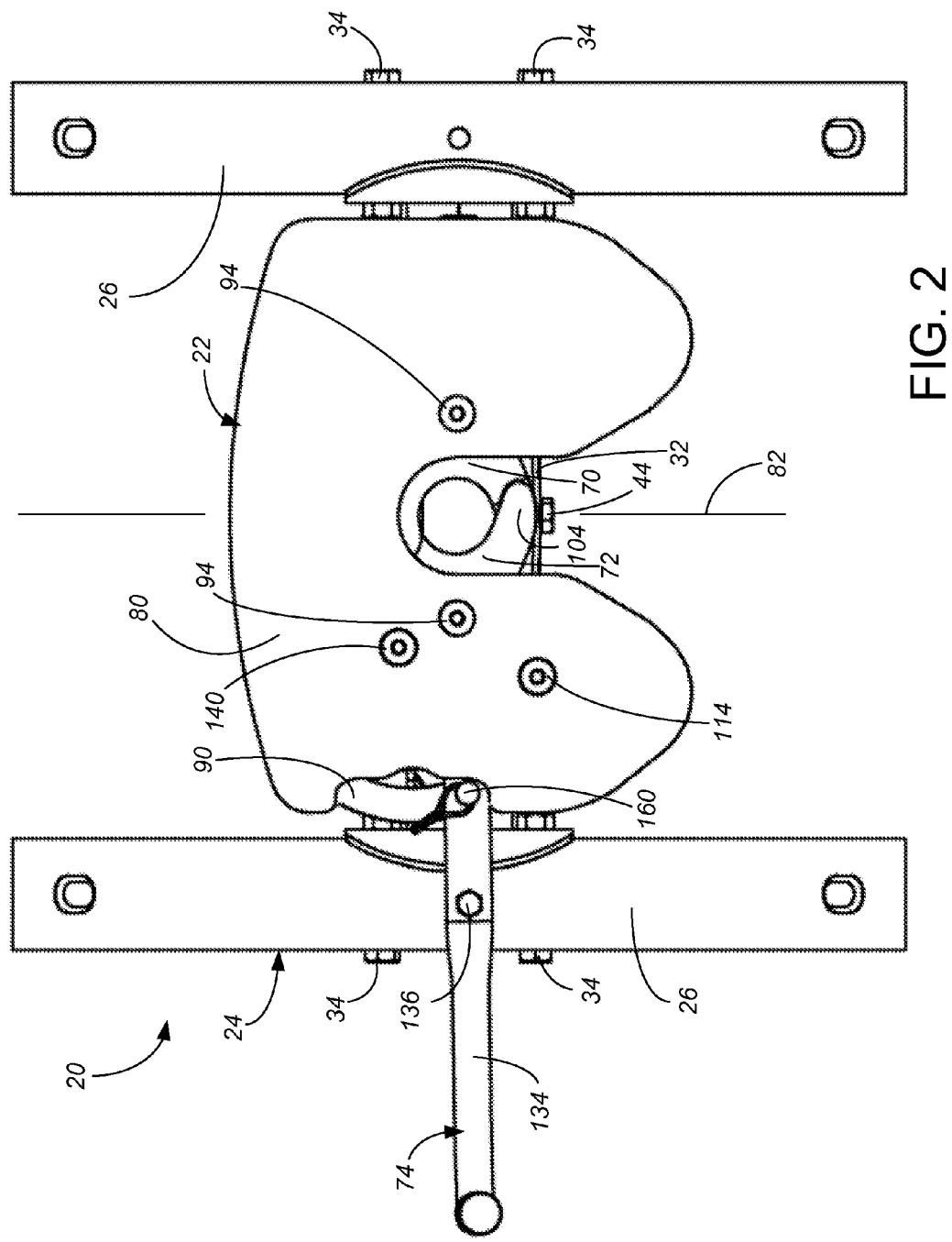
FIG. 2 is a top view of the fifth wheel hitch of FIG. 1, with the front of the fifth wheel hitch at the top of the page. The terms "front", "rear" or "behind", "passenger's side" (for U.S.) or "right", and "driver's side" (for U.S.) or "left", for all uses herein, all refer to the designed forward direction of travel to the towing vehicle.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention can be provided as part of a fifth wheel hitch 20 as shown in FIGS. 1-5, which can be mounted in the bed of a pick-up truck (not shown) to support the weight of a kingpin type trailer (not shown) over the rear axle of the pickup truck. The fifth wheel hitch 20 includes a head assembly 22 mounted to a base support structure 24, with the base support structure 24 shown in an exploded view in FIG. 5. The base support structure 24 could have widely varying constructions, but in the preferred embodiment includes two mounting channel weldments 26 that include tabs 28 on their feet 30 for mounting into rails (not shown) secured on the bed of the pickup truck (not shown). A crossmember weldment 32 is secured by bolts 34 between the two mounting channel weldments 26, enabling a user to select the elevation of the crossmember weldment 32 relative to the pickup bed.

The head assembly 22 can pivot in several different degrees of freedom relative to the crossmember weldment 32, such that the head assembly 22 when towing a kingpin trailer can pivot as the trailer accommodates turns, hills, etc. In the preferred embodiment, the pivoting is provided with a head support yoke 36, best seen in FIG. 5. The head support yoke 36 has a central opening 38, and is retained in the crossmember weldment 32 by a torsion pin weldment 40 extending through the central opening 38 in the yoke 36 as well as through an opening 42 in the crossmember weldment 32. The torsion pin weldment 40 is secured to the opening 42 in the crossmember weldment 32 using a bolt 44, enabling assembly and disassembly of the yoke 36 to the crossmember weldment 32 as needed. The shape of the torsion pin weldment 40 mates with the shape of the corresponding central opening 38 in the yoke 36 as well as the shape of the opening 42 in the crossmember weldment 32. In the preferred embodiment, these shapes are square, but the central opening 38 in the yoke 36 is larger than the size of the torsion pin weldment 40. A torsion insert 46 is placed around the torsion pin weldment 40 within the central opening 38 in the yoke 36, compression/twisting of which enables the yoke 36 to pivot about and move somewhat relative to the axis 48 of the torsion pin weldment 40. Two wear plates 50 are positioned on either side of the yoke 36, between the yoke 36 and the crossmember weldment 32, so the pivoting of the yoke 36 about the axis 48 creates minimum friction and wear.

At a top end of the yoke 36 extending above the crossmember weldment 32, the yoke 36 includes two shaped ears 52 defining a second pivot axis 54 for the head assembly 22. Like the torsion pin weldment 40, the ears 52 in the preferred embodiment are square and surrounded by torsion inserts 56. These torsion inserts 56 are received in mating recesses 58 (best seen in FIG. 6) in the head assembly 22. Rather than fully encircling the ears 52/torsion inserts 56, the recesses 58 only contact three of the four sides of the torsion inserts 56, so the head assembly 22 can be easily attached to and removed from the yoke 36. If desired to reduce the number of different parts, the ears 52 may be the same size and shape as the torsion pin weldment 40, and the recesses 58 may be the same size and shape as the opening 38, so the torsion inserts 56 can be identical parts to torsion insert 46. Attachment pins 60 extend through mating holes in the yoke 36 and holes 62 in the head assembly 22 to secure the head assembly 22 to the yoke 36 in the vertical direction. In the preferred embodiment, each attachment pin 60 includes a slanted end which resides in a slot 64 in the yoke 36. Each attachment pin 60 is held in place by a cotter pin clip 66. While the extension of the attachment pins 60 through the ears 52 and the holes 62 in the head assembly 22 largely prevents vertical or horizontal movement of the head assembly 22 relative to the yoke 36, compression/twisting of the two torsion inserts 56 enables the head assembly 22 to pivot somewhat about the axis 54 of the ears 52. The attachment pins 60 and cotter pin clips 66 allow for quick attachment and detachment of the head assembly 22 relative to the base support structure 24.

Other than the wear plates 50 and the torsion inserts 46, all the components of the base support structure 24 can be formed of a suitably strong metal such as steel (ASTM A36 with a powder coat finish, or standard plated alloy steel nuts and bolts) or equivalent materials. The wear plates 50 should be formed of a material with better bearing/wear properties, such as a strong polymer providing a low friction surface, in the preferred embodiment formed of AR Glass-filled ultra-high-molecular-weight polyethylene. The torsion inserts 46, 56 should be formed of a resilient, compressible material, such as rubber or more preferably polyurethane.

Figure 6:
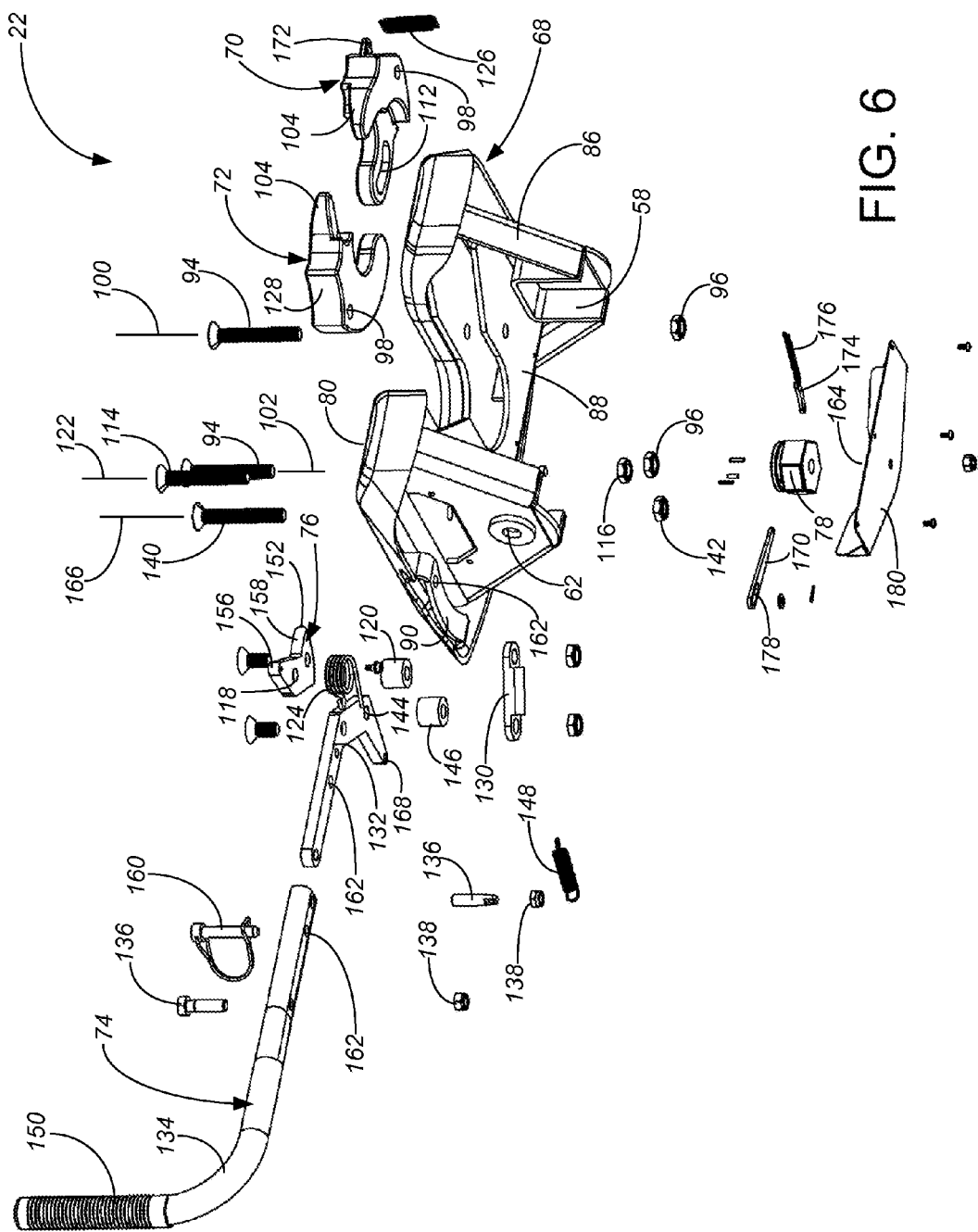
FIG. 6 is an exploded rear bottom perspective view of the head assembly of the fifth wheel hitch of FIGS. 1-5.

An exploded view of the various component parts of the head assembly 22 is shown in FIG. 6. The head assembly 22 primarily includes a full head weldment 68, two jaws 70, 72, a handle 74, a pawl 76, and a hitch position indicator 78. The full head weldment 68 provides the horseshoe shaped skid plate 80 as generally known in the art. The opening between the sides of the skid plate 80 defines a midplane 82 (shown in FIG. 7) of the hitch 20 and defines the direction that the kingpin 84 travels during hitching and unhitching, which is open to the rear of the towing vehicle. (The terms "rear" and "front" for all uses herein all refer to the designed forward direction of travel to the towing vehicle). The full head weldment 68 also provides structure underneath the skid plate 80 that allows for attaching and supporting the other components relative to the skid plate 80 and above the base support structure 24. In the preferred embodiment, the structure under the skid plate 80 for attaching the skid plate 80 above the base support structure 24 includes two legs 86 which define recesses 58 for receiving the torsion inserts 56, as well as two pin openings 62 for receiving the attachment pins 60. The structure under the skid plate 80 for attaching and supporting the other head components relative to the skid plate 80 includes a lower mounting plate 88 (shown in FIG. 6) spaced relative to the underneath surface of the skid plate 80, a handle lock plate 90, and an indicator axle 92 (shown in FIG. 7).

Figure 5:
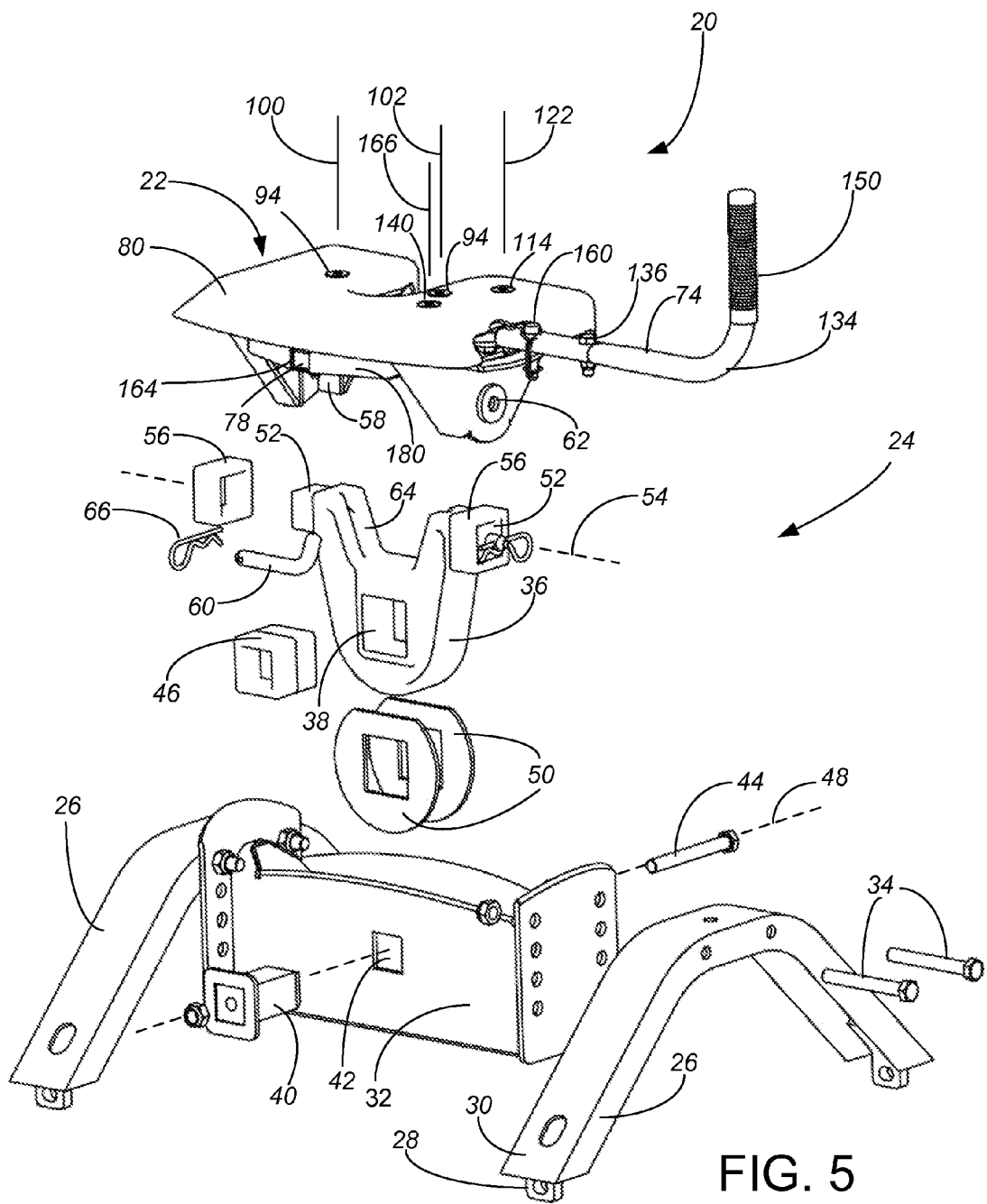
FIG. 5 is an exploded top front perspective view of the fifth wheel hitch of FIGS. 1-4.

Each jaw 70, 72 is pivotally attached to the full head weldment 68 by a flat socket head cap screw 94 and nut 96, extending through corresponding holes in the full head weldment 68 and corresponding holes 98 (best seen in FIGS. 11-13 and 16-18) in each jaw 70, 72. Thus, as shown in FIGS. 1, 5 and 6, the right (passenger side) jaw 70 pivots about a right jaw pivot axis 100, and left (driver side) jaw 72 pivots about a left jaw pivot axis 102. In the preferred embodiment, each jaw 70, 72 is about 30 mm thick.

The jaws 70, 72 provide several features which are beneficial over the prior art. A first such feature involves the portion of the jaws 70, 72 which hold the kingpin 84 in the towing position. As best shown in FIGS. 6-22, each jaw 70, 72 includes a locking arm 104 which wraps around past the midplane 82 of the skid plate 80, i.e., the left jaw 72 extends around to the right of the midplane 82 and the right jaw 70 extends around to the left of the midplane 82. Each of these locking arms 104 is substantial and strong, preferably strong enough to unilaterally support the towing load of the kingpin 84. In the preferred embodiment with the jaws 70, 72 formed of ASTM A36 steel, the locking arms 104 are about 15 mm thick at the midplane 82.

Rather than have a horizontal or vertical interface between the two locking arms 104 behind the kingpin 84, the interface between the two locking arms 104 behind the kingpin 84 extends at an angle 106, called out in FIGS. 14, 15, 20 and 21. In the preferred embodiment, this angle 106 is about 15°, such that the locking arms 104 vary in height/thickness from about 20 mm to 10 mm in the active area of the jaw 70, 72 in the region behind the kingpin 84 and within the opening in the skid plate 80. By having the interface at an angle 106, even if one or both jaws 70, 72 are slightly out of alignment when coming together from the open position to the locked position, there is no possibility of a collision between the jaws 70, 72 prior to the jaws 70, 72 being fully closed. The locking arms 104 are about 30 mm deep at the midplane 82 behind the kingpin 84, i.e., each have an area of about 450 $mm^2$ when taken at the midplane 82 behind the kingpin 84. The preferred jaws 70, 72 have a curved plan view outer profile (best shown in FIGS. 13 and 19), and the depth of the locking arms 104 varies from about 30 mm to 20 mm in the active area of the jaw 70, 72 in the region behind the kingpin 84 and within the opening in the skid plate 80.

As best seen in FIGS. 11, 12, 17 and 18, each jaw 70, 72 has a generally semi-circular contact surface 108 with the kingpin 84 in the locked position. In the preferred embodiment, the contact surface 108 of each jaw 70, 72 has a height of 15 mm in front of the kingpin 84, and has the full 30 mm height throughout the contact surface 108 behind the kingpin 84, with each contact surface 108 terminating just before the midplane 82. The locking arms 104 extend away from this contact surface 108, such that the locking arms 104 do not contact the kingpin 84 at all while the hitch 20 is locked around the kingpin 84 during ordinary use. Should the closed position of the jaws 70, 72 become at all "sloppy" during years of use, the locking arms 104 may contact the kingpin 84 and the kingpin 84 has no possibility of wedging between contact surfaces 108 of the two jaws 70, 72 to further force the jaws 70, 72 open. Regardless of the presence or absence of contact between the locking arms 104 and the kingpin 84 when the hitch 20 is in the locked position, the locking arms 104 play an important role in providing a real and consumer-perceived level of safety. The locking arms 104 fully wrap around the kingpin 84 (looking from the rear like two fingers enclenched around the kingpin 84) with two different locking arms 104 preventing any possibility that the kingpin 84 could escape from the skid plate opening. In a plan view, each jaw 70, 72 in the closed position takes the shape of a letter "C" in sign language, such that jaws 70, 72 resemble two hands gripping around the kingpin 84. Even if one jaw should catastrophically fail or open, the other jaw could single-handedly lock the kingpin 84 in towing position. This double layer of safety is both real (due to redundancy in the case of part failure) and readily perceived by the user as providing a stronger hitch product (even though, in ordinary operation, the locking arms 104 never contact or bear any of the stress from the kingpin 84).

As an alternative arrangement for the jaws 70, 72, the locking arms 104 can extend tighter to the kingpin 84 and make up part of the contact surface with the kingpin 84. In such an arrangement, a portion of the contact surface of one closed jaw would be directly underneath a portion of the contact surface of the other closed jaw, and each contact surface would extend behind the kingpin 84 past the midplane 82 in the closed position. In the preferred arrangement, however, the jaws 70, 72 do not have to rotate quite as far to release the kingpin 84. Moreover, in the preferred arrangement, the contact surfaces 108 (which cannot extend more than 180° around the kingpin 84 for each jaw 70, 72) can collectively contact about 360° around the kingpin, rather than having a portion in front of the kingpin 84 without contact.

A second beneficial feature over prior art jaws is provided on the other end of the jaws 70, 72. One of the jaws 72 is a driven jaw, and includes a projection 110. The other jaw 70 is a driving jaw and includes a slot 112 which receives this projection 110. Both the projection 110 and the slot 112 are at the elevation where the jaw contacts the kingpin 84. The coupling of the projection 110 into the slot 112 causes the driving jaw 70 to push/pull the driven jaw 72 with it, such that neither jaw 70, 72 can pivot about its pivot point 100, 102 without the other jaw 70, 72 simultaneously pivoting.

Figure 17:
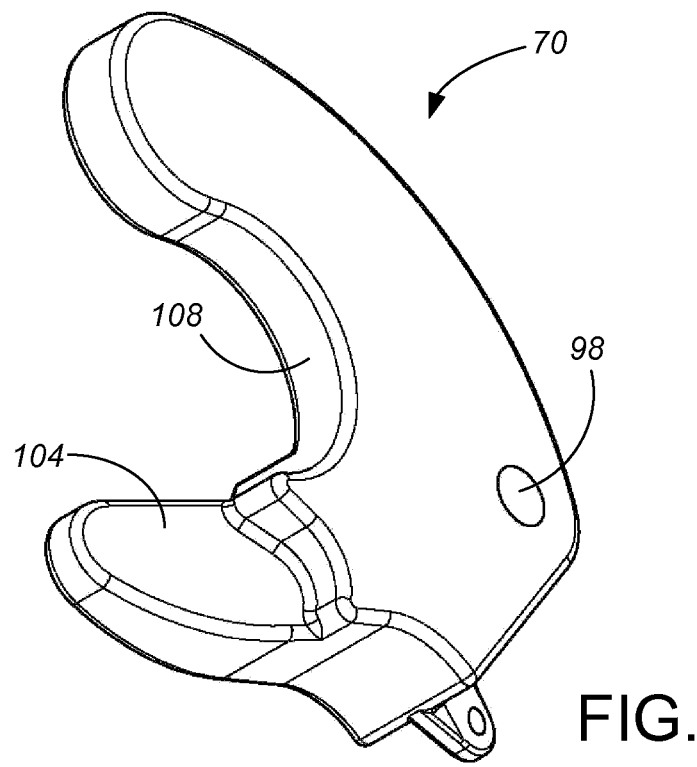
Figure 20:
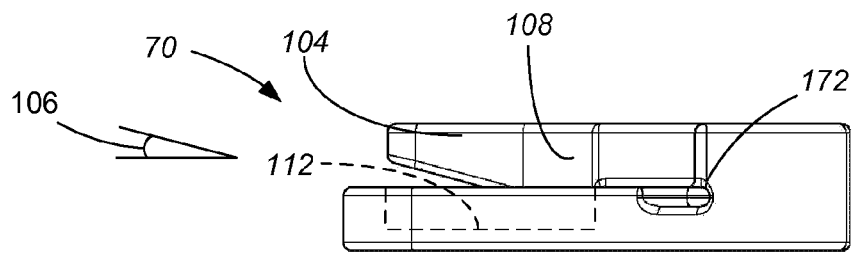
FIGS. 19-22 are top (plan, with the front of the jaw at the top of the page), front, rear (elevation) and side views of the driving (passenger's side) jaw of FIGS. 17 and 18.
Figures 19, 22:
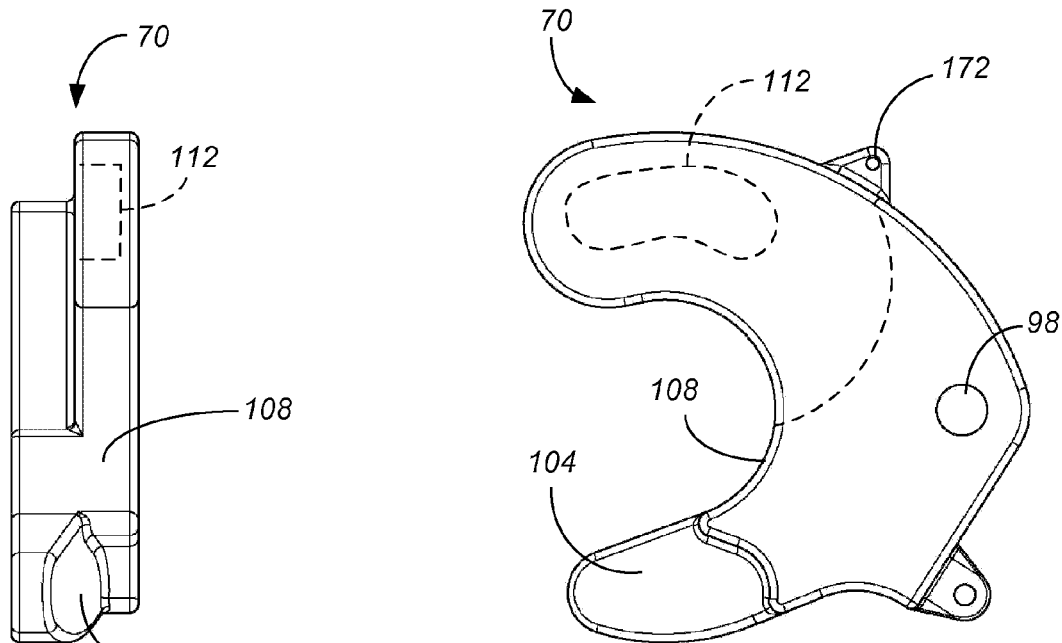
Figure 21:
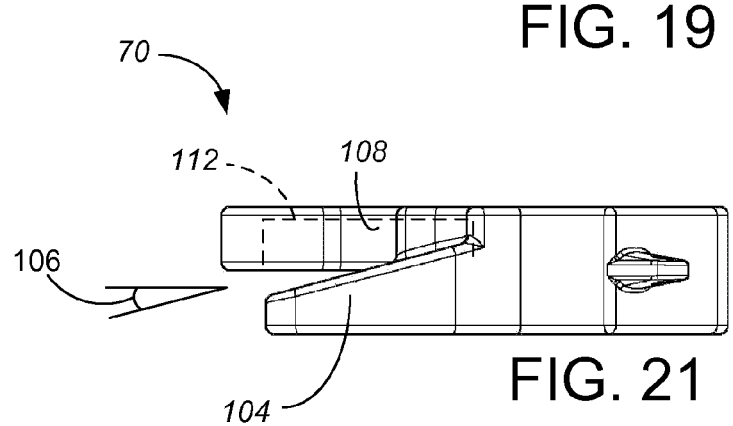

As best shown in FIGS. 17 and 19, the slot 112 is not linear, but rather is arcuate. By having an arcuate slot 112 with an appropriately shaped arc, the angular location of each jaw 70, 72 is maintained at a generally equivalent and opposite position to the other jaw 70, 72, i.e., if driving jaw 70 is at a 5° open position, then driven jaw 72 is at a 5° open position; if driving jaw 70 is at a 10° open position, then driven jaw 72 is at a 10° open position, etc. The simultaneous and equal movement of the jaws 70, 72 achieved by the present invention reinforces the understanding of the consumer that both jaws 70, 72 work equally to strongly hold the kingpin 84 in the closed position.

A third beneficial feature over the prior art jaws relates to the pawl locking arrangement of the present invention. The pawl 76 is pivotally attached to the full head weldment 68 by a flat socket head cap screw 114 and nut 116 (shown in FIG. 6), extending through a corresponding hole in the full head weldment 68 and a corresponding hole 118 in the pawl 76 as well as through a pawl spacer 120. Thus, the pawl 76 pivots about a pawl pivot axis 122. A torsion spring 124 gently biases the pawl 76 toward an open position.

Figure 7:
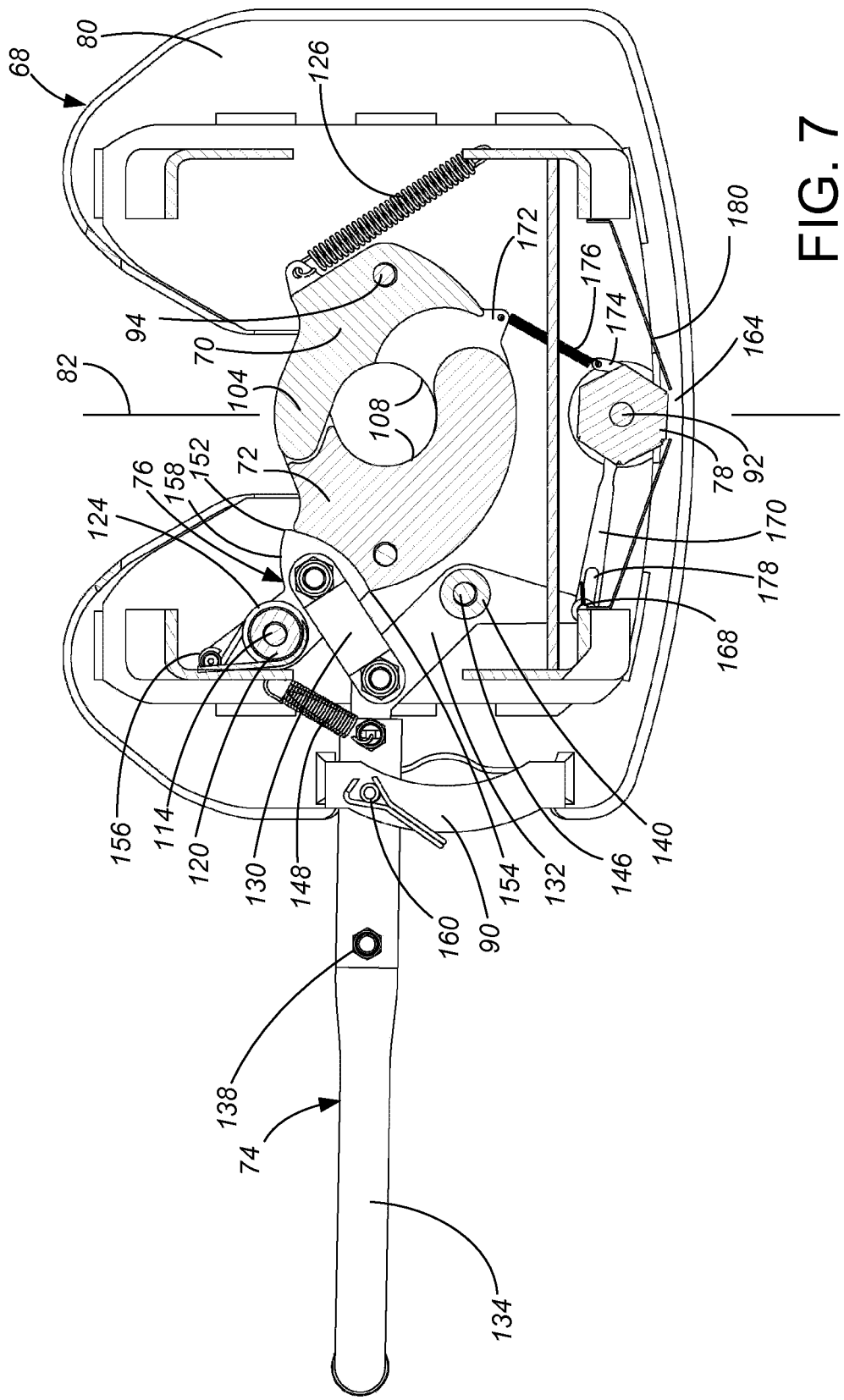
FIG. 7 is a bottom view (looking up), in partial cross-section, of the assembled head assembly of FIGS. 1-6, with the front of the hitch at the bottom of the page.
Figure 8:
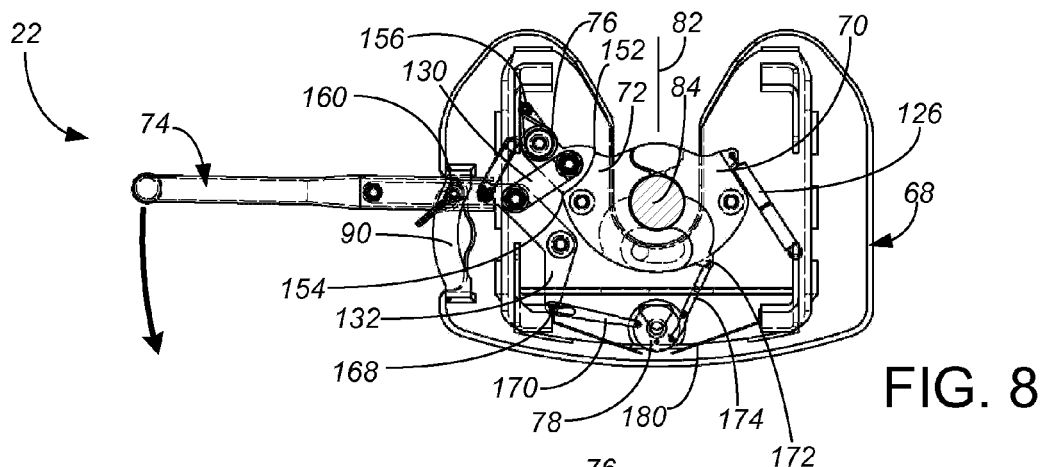
FIGS. 8-10 are views similar to FIG. 7, also showing the kingpin in cross-section, showing operation of the fifth wheel hitch of FIGS. 1-7.
Figure 9:
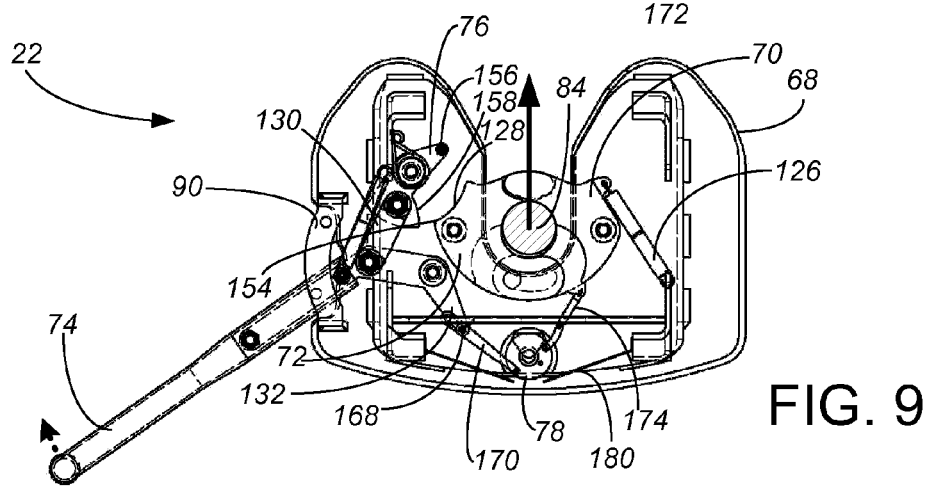

As best shown in FIGS. 7-10, movement of the jaws 70, 72 is controlled by a jaw tension spring 126 and the pawl 76. The tension spring 126 biases the driving jaw 70 (and, through the projection/slot coupling, the driven jaw 72) toward the open position. While the pawl 76 is in the locked position of FIGS. 7 and 8, however, pawl 76 bears and interferes against a pawl stop surface 128 (called out in FIGS. 9, 11-13 and 15) of the driven jaw 72 to prevent both jaws 70, 72 from opening. In the closed position of FIGS. 7 and 8, the pawl stop surface 128 is in the shape of an arc of a circle centered on the pawl pivot axis 122, i.e., centered on the bolt 114. When the pawl 76 is fully removed from contacting the pawl stop surface 128 as shown in FIG. 9, the jaw tension spring 126 biases both jaws 70, 72 open. The ability of the jaws 70, 72 to open then depends upon the kingpin 84, i.e., the weight of the trailer and force of the kingpin 84 may prevent the jaw spring 126 from ejecting the kingpin 84 from the hitch 20 until the towing vehicle drives away from the trailer, but as soon as the kingpin 84 is out the spring 126 causes the jaws 70, 72 to open.

Movement of the pawl 76 is controlled by the handle 74, which interacts with the pawl 76 through a link 130. For ease of manufacture and assembly, the handle 74 is provided in two parts, including an angular linkage portion 132 received in a tubular portion 134. The angular linkage portion 132 is rigidly joined to the tubular portion 134 with two bolts 136 and nuts 138, with one of the bolts 136 (best shown in FIG. 6) doubling as a tension spring anchor. The handle 74 (including both the angular linkage portion 132 and the tubular portion 134) is pivotally attached to the full head weldment 68 by a flat socket head cap screw 140 and nut 142, extending through a corresponding hole in the full head weldment 68 and a corresponding hole 144 in the handle 74 as well as through a handle spacer 146. When the handle 74 is pushed to pivot the handle 74 counterclockwise (all "clockwise" and "counterclockwise" orientations discussed herein will be taken from below the head assembly 22, as shown in FIGS. 7-10), the link 130 pulls the pawl 76 clockwise.

A handle tension spring 148 biases the handle 74 to the closed position. To move the handle 74 from the closed, locked position, the operator must overcome the force of the handle tension spring 148 as well as the friction force between the driven jaw 72 and the pawl 76. A rubber handle grip 150 may be included on the tubular portion 134, making it easier for the operator to push on and move the handle 74 to overcome the tension and friction forces. While the torsion spring 124 tends to bias the handle 74 away from the closed position, the spring constant of the handle tension spring 148 is much higher than the spring constant of the torsion spring 124, such that the handle tension spring 148 dominates over the torsion spring 124 for the majority of the handle throw. As the handle 74 pivots, the link 130 takes more and more of the stress of the handle tension spring 148 and provides a mechanical advantage such that the handle throw gets easier and easier even though the tension in the spring 148 is increasing. When the handle 74 gets near the fully opened position, however, the link 130 is nearly inline with the pawl pivot axis 122, such that the link 130 supports essentially all of the force of the handle tension spring 148. At this point, the torsion spring 124 overcomes the handle tension spring 148 to hold the pawl 76 and the handle 74 fully opened. (Because the link 130 is not fully inline with the pawl pivot axis 122, and as long as the jaws 70, 72 remain fully closed, the operator can still pull the handle 74 back to its original closed position shown in FIG. 8 if desired). In the preferred embodiment, the torsion spring 124 overcomes the handle tension spring 148 after a handle throw of about 18°, biasing the handle 74 to a fully opened position where the handle 74 is 20° from its fully closed position. During this opening throw, the link 130 has caused the pawl 76 to rotate about 78° from its locked position shown in FIGS. 7 and 8 to its fully opened, unlocked position shown in FIG. 9.

Once the corner 152 of the pawl 76 clears the corner 154 of the driven jaw 72 during the opening handle throw (i.e., in the preferred embodiment, when the handle 74 is about 15° from its locked position and the pawl 76 is about 60° from its locked position), the jaws 70, 72 are free to release open under the force of the jaw tension spring 126. Generally speaking, the jaw opening force of the jaw tension spring 126 is not enough to move the kingpin 84, and the kingpin 84 will maintain the jaws 70, 72 in a closed position until the towing vehicle is driven away from the kingpin 84. The jaws 70, 72 open as far as the kingpin 84 will let them while the towing vehicle is driven away from the kingpin 84, until the kingpin 84 is fully cleared. In the preferred embodiment, a minimum of about 40° of jaw rotation (of each jaw 70, 72) is required before the kingpin 84 can escape from the jaws 70, 72. As the jaws 70, 72 approach a fully opened position toward the position of FIG. 10 (i.e., once the kingpin 84 permits the jaws 70, 72 to rotate about 50° from their closed position in the preferred embodiment), the arm 104 of the driven jaw 72 contacts the reset corner 156 of the pawl 76. The opening force of the jaw tension spring 126 is greater than the force of the torsion spring 124. The opening of the jaws 70, 72 overcomes the force of the torsion spring 124 and moves the pawl 76. As the jaws 70, 72 complete their opening rotation (i.e., in the preferred embodiment, rotating the jaws 70, 72 from about 50° to a fully opened position of about 58° from the closed position), the arm 104 of the driven jaw 72 riding on the reset corner 156 of the pawl 76 causes the pawl 76 to rotate counterclockwise (i.e., in the preferred embodiment, rotating the pawl 76 from about 78° to about 60° from its locked position). This rotation of the pawl 76 in turn causes rotation of the handle 74 from about 20° to about 16° from its locked position, with the handle spring 148 now overcoming the torsion spring 124 to bias the handle 74 clockwise back toward its locked position and to bias the pawl 76 counterclockwise. The open stop surface 158 (called out in FIGS. 7 and 9) of the pawl 76 now contacts against the pawl stop surface 128 (called out in FIG. 9) of the driven jaw 72 in the opened position shown in FIG. 10. The opened driven jaw 72 (due to the jaw tension spring 126) now prevents the pawl 76 and handle 74 from pivoting further under the force of the handle tension spring 148.

Figure 10:
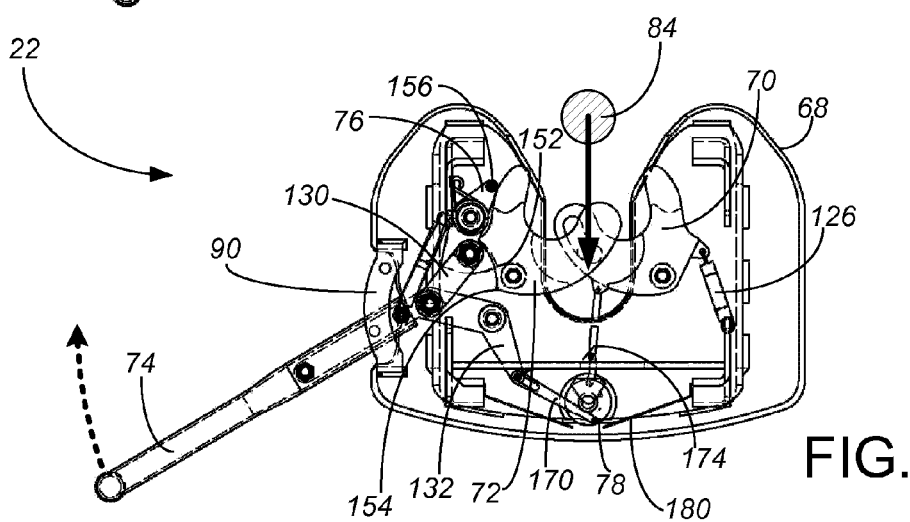
Figure 12:
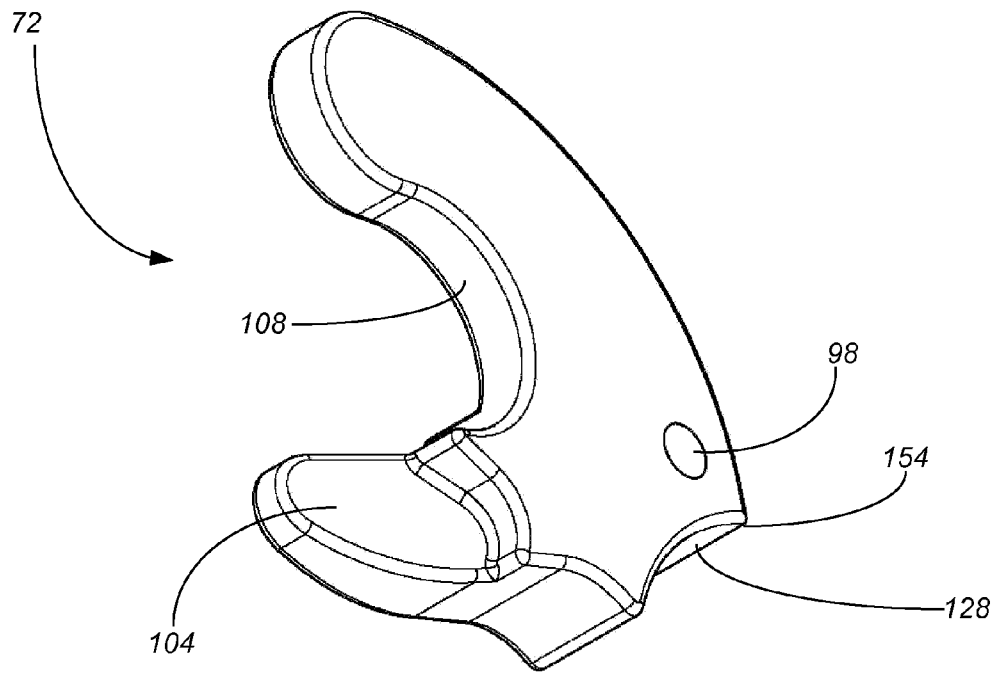
FIGS. 11 and 12 are perspective view of the driven (driver's side) jaw of the fifth wheel hitch of FIGS. 1-7.
Figure 11:
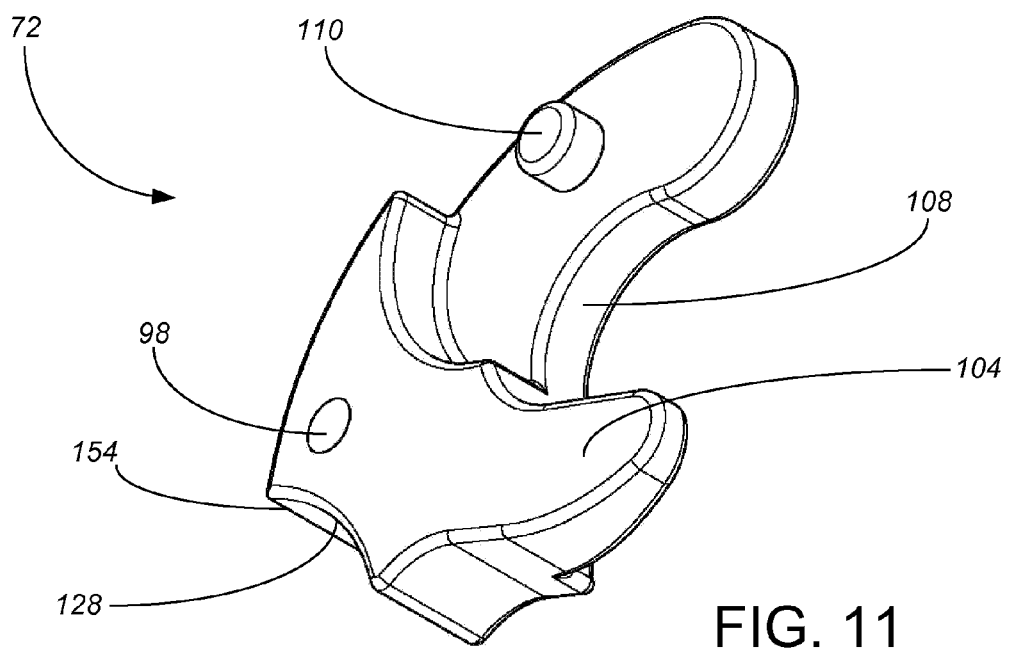
Figure 18:
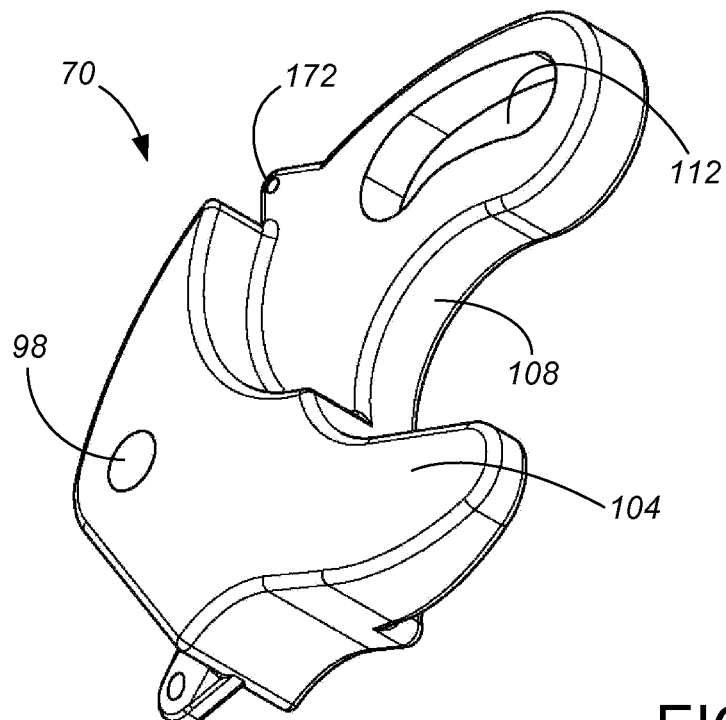
FIGS. 17 and 18 are perspective view of the driving (passenger's side) jaw of the fifth wheel hitch of FIGS. 1-7.

The hitch 20 will remain in this open position shown in FIG. 10 until a force on the jaws 70, 72 overcomes the jaw tension spring 126 and causes the jaws 70, 72 to close, such as when the towing vehicle is again backed into towing position against the kingpin 84. As the kingpin 84 pushes forward in the skid plate 80, the kingpin 84 closes the jaws 70, 72 around it. Once the jaws 70, 72 sufficiently close around the kingpin 84, the pawl 76 rotates back to the locked position shown in FIGS. 7 and 8, with the nose 152 of the pawl 76 past the pawl stop surface 128 of the driven jaw 72. Interference between the driven jaw 72 and the pawl 76 now prevents any opening of the jaws 70, 72 until the handle 74 is once again pushed to move the pawl 76 out of the way.

The lock plate 90 and a latch pin 160 interact with the handle 74 in the closed position to prevent inadvertent movement of the handle 74 from the closed position of FIGS. 7 and 8. The handle 74 and the lock plate 90 both include mating openings 162 for the latch pin 160. The user must remove the latch pin 160 from these openings 162 in order to open the handle 74.

The preferred embodiment of the present invention also includes a rotary position indicator 78. A portion of the position indicator 78 is viewable through an opening 164 in the full head weldment 68, and thus can be seen from someone in front of the hitch 20 such as by the driver of the towing vehicle. The preferred position indicator 78 is hexagonal and mounted on an axle 92. Three adjacent sides of the position indicator 78 are marked, such as with green, red and yellow coloring, with only one of the three sides showing through the opening 164.

Linkage mechanisms to both the handle 74 and the driving jaw 70 are used to control rotation of the position indicator 78 between the three indications. The angular linkage portion 132 of the handle 74 extends past the handle pivot point 166 to an attachment point 168 for a handle indicator link 170. The driving jaw 70 includes an attachment point 172 for a jaw indicator link 174. The jaw indicator link 174 includes a tension spring 176. When the handle 74 is in the closed position as shown in FIGS. 7 and 8, the handle indicator link 170 pulls the position indicator 78 so a green side of the position indicator 78 is visible through the opening 164, with the tension spring 176 at least partially extended. The green indication signals to the operator that the fifth wheel hitch 20 is locked and ready for towing.

As the handle 74 is rotated to the position shown in FIG. 9, contraction of the tension spring 176 in the jaw indicator link 174 pulls on the position indicator 78 to rotate the position indicator 78 counterclockwise, until the red side of the position indicator 78 is visible through the opening 164. The handle indicator link 170 includes a slot 178, and the handle attachment 168 translates within the slot 178 to the proximal end of the slot 178 without further rotation of the position indicator 78. The red indication signals to the operator that the fifth wheel hitch 20 is unlocked but closed. The operator can drive away from the kingpin 84 in this position, but should be prepared for the towed load to disengage. If the kingpin 84 is not in the hitch 20, the red indication signals that the hitch 20 is not ready for kingpin engagement.

When the jaws 70, 72 open to the position shown in FIG. 10, the jaw end of the jaw indicator link 174 moves with driving jaw 70, further pulling the position indicator 78 about another 60° around the axle 92, so the yellow side of the position indicator 78 is visible through the opening 164. The handle attachment 168 translates back within the slot 178 to the distal end of the slot 178, so the fact that the handle 74 moves very little from the unlocked position of FIG. 9 to the opened position of FIG. 10 has no effect on rotation of the position indicator 78. The yellow indication signals to the operator that the fifth wheel hitch 20 is open and ready for hitching.

When the jaws 70, 72 close around the kingpin 84 and the handle 74 moves back to the closed position of FIGS. 7 and 8, the handle indicator link 170 pulls the position indicator 120° so the green side of the position indicator 78 is again showing through the opening 164. A shield 180 (best shown in FIGS. 5 and 6) can be positioned to hold the position indicator 78 in place on the axle 92 and to partially hide the position indicator 78 so only a single side of the position indicator is visible. The position indicator 78 thus signals to the operator very clearly and unambiguously, in a location visible to the driver of the towing vehicle that does not move, what position (locked, unlocked, or open) the hitch 20 is in.

For the most part, the components of the head assembly 22 can be formed of a strong metal, such as out of ASTM A36 steel, powder coated for aesthetic appearance and corrosion resistance. Various pins, bolts and nuts can be those readily commercially available, such as formed of stainless steel, and the linkages can also be formed of ASTM 304 stainless steel. In the preferred embodiment, the jaw tension spring 126 has a spring rate of 20 lb/in, the handle tension spring 148 has a spring rate of 18 lb/in, and the extension spring 176 of the jaw linkage has a spring rate of 3 lb/in. The position indicator 78 can be formed of nylon 6/6 or similar non-corroding or corrosion-resistant material which will maintain the colors (or other indication) over years of use.

Although the present invention has been described with reference to preferred embodiments, workers skilled in the art will recognize that changes may be made in form and detail without departing from the spirit and scope of the invention.

The invention claimed is:

1. A fifth wheel hitch comprising:
   a support structure for supporting the fifth wheel hitch relative to a towing vehicle; and
   first and second jaws movably supported by the support structure, each jaw being movable between a closed position wherein the first and second jaws jointly define at least a portion of a kingpin containment for holding a kingpin in towing engagement by the fifth wheel hitch and an opened position wherein the kingpin is releasable from the fifth wheel hitch, each jaw having a kingpin contacting surface in the closed position, wherein, when in the opened position, a portion of the first jaw overlaps a portion of the second jaw at a first overlapping interface, and wherein the first overlapping interface is at an elevation of the kingpin containment;
   wherein the first and second jaws are part of a head assembly further comprising a skid plate, wherein the first jaw is movable by pivoting about a first jaw pivot axis which is stationary relative to the skid plate, wherein the second jaw is movable by pivoting about a second jaw pivot axis which is stationary relative to the skid plate, and wherein the first jaw comprises an extension coupled into a slot of the second jaw, the extension being separated from the first jaw pivot axis and the slot being separated from the second jaw pivot axis, the coupling of the extension into the slot causing the first and second jaws to pivot simultaneously.

2. The fifth wheel hitch of claim 1, wherein the first and second jaws are part of a head assembly further comprising a skid plate, wherein the first jaw is movable by pivoting about a first jaw pivot axis which is stationary relative to the skid plate, wherein the second jaw is movable by pivoting about a second jaw pivot axis which is stationary relative to the skid plate, and wherein, when in the closed position, the first overlapping interface is at a location behind the kingpin containment.

3. The fifth wheel hitch of claim 2, wherein, when in the closed position, a portion of the first jaw overlaps a portion of the second jaw at a second overlapping interface at a location in front of the kingpin containment.

4. The fifth wheel hitch of claim 1, wherein the first and second jaws are part of a head assembly further comprising a skid plate, wherein, in the closed position, each of the first jaw and the second jaw extend more than 180° around an axis of the kingpin containment location, with each of the first jaw and the second jaw comprising a locking arm which wraps around past a midplane of the skid plate.

5. The fifth wheel hitch of claim 1, wherein the first and second jaws each pivot between the closed position and the opened position without changing elevation, and wherein the kingpin contacting surface of each of the first and second jaws extends about 180° around the kingpin when in the closed position, with each of the first jaw and the second jaw comprising a locking arm which does not contact the kingpin at all while the hitch is in the closed position.

6. The fifth wheel hitch of claim 1, wherein the slot is arcuate, so the first jaw and the second jaw pivot at equally opposing angular positions throughout the movement between the closed position and the opened position.

7. The fifth wheel hitch of claim 1, wherein the extension is located on the first jaw within the first overlapping interface, and wherein the slot is located on the second jaw within the first overlapping interface, and wherein one of the jaws drives the other jaw via the extension in the slot.

8. The fifth wheel hitch of claim 1, wherein the first jaw and the second jaw each have a thickness which varies at the first overlapping interface.

9. The fifth wheel hitch of claim 8, wherein the first overlapping interface has a slope.

10. The fifth wheel hitch of claim 1, further comprising a pawl pivotably supported by the support structure, the pawl having a locking position wherein the pawl interferes with rotation of at least one of the first and second jaws from the closed position.

11. The fifth wheel hitch of claim 10, further comprising a movable handle linked to the pawl, the movable handle pivoting between a locked position, wherein the pawl is in its locking position holding the first and second jaws in the closed position, to a release position, wherein the pawl is pulled from its locking position and the jaws are free to move to the opened position, to a ready-for-kingpin-hitching position, wherein the jaws are in the opened position but the pawl will freely revert to its locking position as soon as the jaws move to the closed position.

12. A fifth wheel hitch comprising:
   a support structure for supporting the fifth wheel hitch relative to a towing vehicle;
   first and second jaws movably supported by the support structure, each jaw being movable between a closed position wherein the first and second jaws jointly define at least a portion of a kingpin containment for holding a kingpin in towing engagement by the fifth wheel hitch and an opened position wherein the kingpin is releasable from the fifth wheel hitch, each jaw having a kingpin contacting surface in the closed position, wherein, when in the opened position, a portion of the first jaw overlaps a portion of the second jaw at a first overlapping interface, and wherein the first overlapping interface is at an elevation of the kingpin containment; and
   a lock indicator, viewable from a front of the fifth wheel hitch, the lock indicator having a first indication when the first and second jaws are in the closed position and the pawl is in the locking position, the lock indicator having a second indication when the first and second jaws are in the closed position and the pawl is not in the locking position, the lock indicator having a third indication when the first and second jaws are in the opened position.

13. The fifth wheel hitch of claim 12, wherein the lock indicator rotates, with any of three sides viewable from a front of the fifth wheel hitch, with a first side in green visible when the lock indicator is providing the first indication, with a second side in red visible when the lock indicator is providing the second indication, and with a third side in yellow when the lock indicator is providing the third indication.

14. A fifth wheel hitch comprising:
one or more jaws for engaging a kingpin of a towing vehicle;
a handle coupled to the jaws for locking the jaws closed and for opening the jaws; and
a position indicator, coupled both to the handle and to the one or more jaws, the position indicator having three indications comprising a first indication that the jaws are closed and the handle is in a locked position, a second indication that the jaws are closed and the handle is in an unlocked position, and a third indication that the jaws are open.

15. The fifth wheel hitch of claim 14, wherein the position indicator is rotary, with the position indicator rotating between a first position wherein the first indication is visible to an operator of a towing vehicle but the second and third indications are hidden, a second position wherein the second indication is visible to an operator of a towing vehicle but the first and third indications are hidden, and a third position wherein the third indication is visible to an operator of a towing vehicle but the first and second indications are hidden.

16. The fifth wheel hitch of claim 14, wherein the position indicator is visible through an opening on a front side of the fifth wheel hitch.

17. The fifth wheel hitch of claim 14, further comprising:
a pawl pivotably supported by the support structure, the pawl having a locking position in which the pawl interferes with movement of at least one jaw from its closed position, the pawl being pivotable to an unlocked position, wherein the jaw can open and release the kingpin without movement of the pawl within its unlocked position; and
a handle linked to the pawl, the handle being supported by the support structure, the handle moving the pawl from its locking position to its unlocked position.

18. The fifth wheel hitch of claim 17, wherein the pawl has a first unlocked position wherein the pawl is biased opened while the jaw is in the closed position, and the pawl having a second unlocked position wherein the pawl is biased closed while the jaw is in opened position.

19. The fifth wheel hitch of claim 17, further comprising:
a jaw spring coupled to the jaw, the jaw spring biasing the jaw away from its closed position; and
a handle spring coupled to the handle, the spring biasing the handle toward its locking position.

* * * * *